(12) United States Patent
Choi et al.

(10) Patent No.: US 9,316,878 B2
(45) Date of Patent: Apr. 19, 2016

(54) LIQUID CRYSTAL DISPLAY DEVICE COMPRISING A STATIC ELECTRICITY ABSORBING PATTERN HAVING A LATTICE PATTERN

(71) Applicant: LG DISPLAY CO., LTD., Seoul (KR)

(72) Inventors: Seongwook Choi, Chilgok-Gun (KR); Eunhong Kim, Daegu (KR); Jonghun Song, Gwangju (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/498,552

(22) Filed: Sep. 26, 2014

(65) Prior Publication Data

US 2015/0346570 A1  Dec. 3, 2015

(30) Foreign Application Priority Data

May 27, 2014  (KR) ........................ 10-2014-0063376

(51) Int. Cl.
| | |
|---|---|
| G02F 1/1333 | (2006.01) |
| G02F 1/1345 | (2006.01) |
| G02F 1/1362 | (2006.01) |
| G02F 1/1343 | (2006.01) |
| G02F 1/1337 | (2006.01) |

(52) U.S. Cl.
CPC ........ *G02F 1/136204* (2013.01); *G02F 1/1333* (2013.01); *G02F 1/13439* (2013.01); *G02F 1/133784* (2013.01); *G02F 2001/133388* (2013.01)

(58) Field of Classification Search
CPC ........... G02F 1/136204; G02F 1/1303; G02F 1/133345; G02F 1/13439; G02F 1/1345
USPC ........................................ 349/40, 150–152
See application file for complete search history.

(56) References Cited

U.S. PATENT DOCUMENTS

| | | | |
|---|---|---|---|
| 5,689,352 A | 11/1997 | Kishigami | |
| 6,392,622 B1 | 5/2002 | Ozawa | |
| 2005/0195338 A1* | 9/2005 | Matsumoto et al. | ............ 349/40 |
| 2007/0091218 A1* | 4/2007 | Huang et al. | .................... 349/40 |
| 2007/0146564 A1* | 6/2007 | Wu | .................. G02F 1/136204 349/40 |
| 2008/0074137 A1 | 3/2008 | Kim et al. | |
| 2009/0279008 A1* | 11/2009 | Lee et al. | ......................... 349/40 |
| 2009/0310051 A1* | 12/2009 | Kim | .................. G02F 1/136204 349/40 |
| 2010/0079694 A1* | 4/2010 | Yoshida | ............ G02F 1/134363 349/40 |
| 2010/0165226 A1 | 7/2010 | Lee et al. | |
| 2010/0238368 A1 | 9/2010 | Kim et al. | |
| 2014/0063394 A1 | 3/2014 | Jung | |

FOREIGN PATENT DOCUMENTS

| | | |
|---|---|---|
| JP | 2009-69725 A | 4/2009 |
| KR | 10-2009-0046406 A | 5/2009 |
| KR | 10-2010-0105935 A | 10/2010 |

* cited by examiner

*Primary Examiner* — Paul Lee
(74) *Attorney, Agent, or Firm* — Birch, Stewart, Kolasch & Birch, LLP

(57) ABSTRACT

The present disclosure is related to a liquid crystal display panel and a liquid crystal display device including: a first substrate including an active area and a non-active area which corresponds to a peripheral area of the active area; a static electricity absorbing pattern of a lattice pattern formed in the non-active area; and a second substrate facing the first substrate.

13 Claims, 17 Drawing Sheets

FIG.14
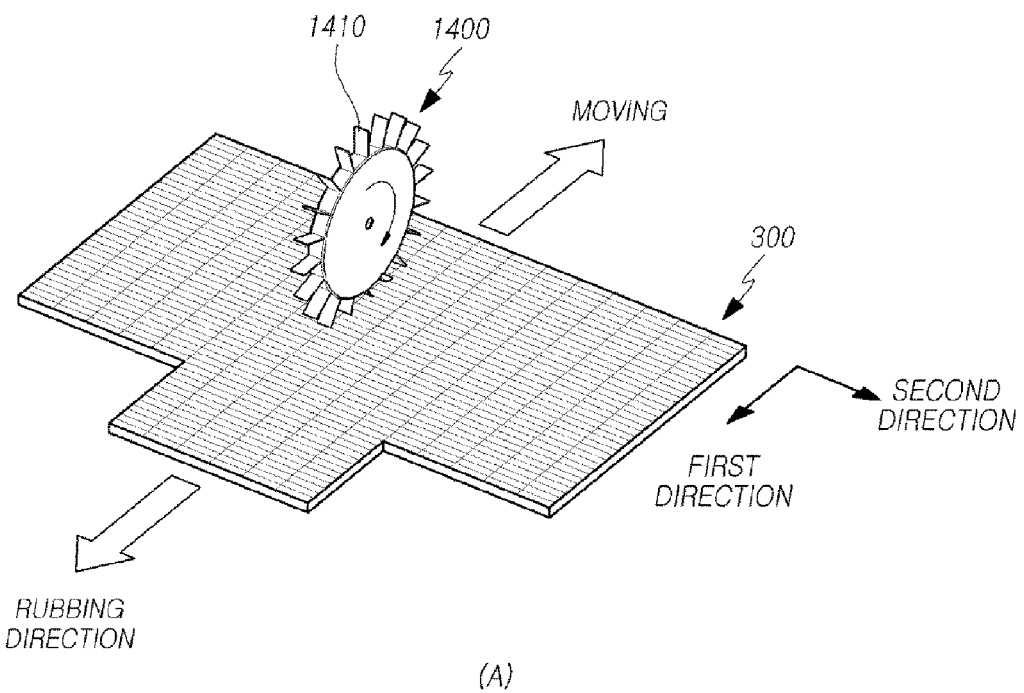
(A)
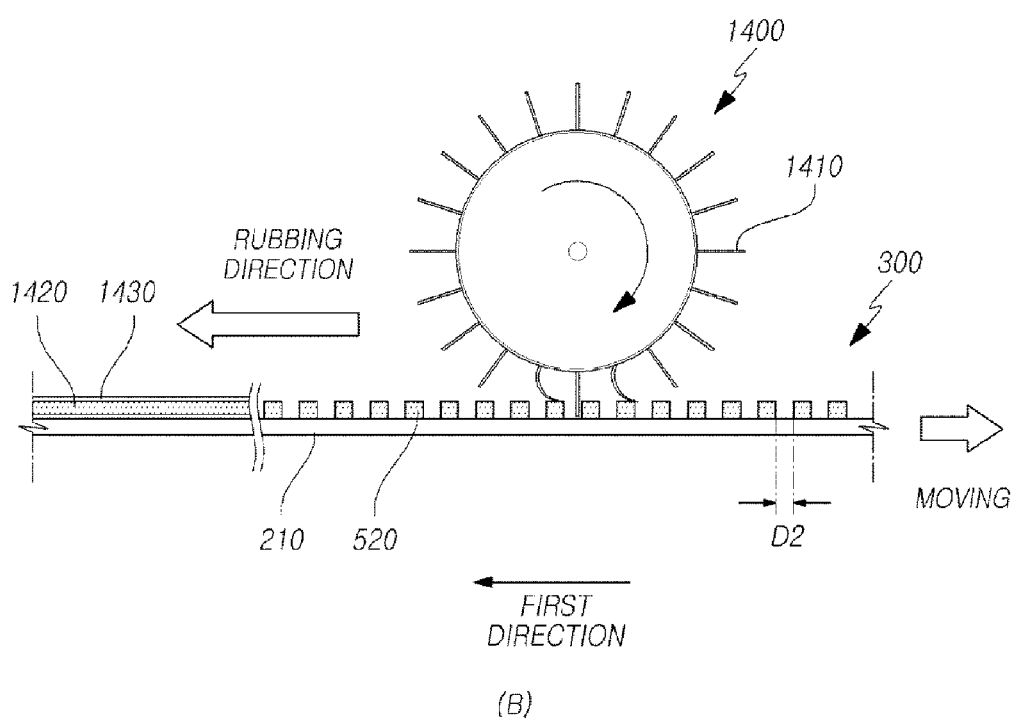
(B)

LIQUID CRYSTAL DISPLAY DEVICE COMPRISING A STATIC ELECTRICITY ABSORBING PATTERN HAVING A LATTICE PATTERN

CROSS-REFERENCE TO RELATED APPLICATION

This application claims priority from and the benefit under 35 U.S.C. §119(a) of Korean Patent Application No. 10-2014-0063376, filed on May 27, 2014, which is hereby incorporated by reference for all purposes as if fully set forth herein.

BACKGROUND OF THE INVENTION

1. Field of the Invention

The present invention relates to a liquid crystal display panel and a liquid crystal display device including a configuration capable of absorbing a static electricity incurred in a rubbing process.

2. Description of the Related Art

Since the technology of a liquid crystal display device has been developing continuously, the liquid crystal display device replaces an out-dated device using an existing Cathod-Ray Tube (CRT) in a display market, a display device for a notebook computer, a computer monitor, television and so on. The liquid crystal display device is also spread to a Digital Information Display (DID) or a Public Information Display (PID) market. In addition, the liquid crystal display device is used in a mobile field.

Meanwhile, when the liquid crystal display device is manufactured, in a rubbing process, in order to form an alignment layer, material of the alignment layer is spread, and aligns a high molecule chain of a surface of the alignment layer material in a certain direction by rubbing the surface of the spread alignment layer material with a rubbing cloth and so on, to form an alignment direction of a liquid crystal molecule.

Such a rubbing process may incur (or generate) static electricity in a substrate on which devices such as a transistor, a color filter and so on are formed. The incurred static electricity may cause defects in the various devices on the substrate, and may decrease throughput of a panel.

SUMMARY OF THE INVENTION

An aspect of the present invention is to provide a liquid crystal display panel and a liquid crystal display device capable of decreasing an effect of static electricity.

Another aspect of the present invention is to provide a method for manufacturing a liquid crystal display panel and a liquid crystal display device including a configuration for discharging static electricity incurred during a rubbing process to the outside of the liquid crystal display panel, and to provide the liquid crystal display panel and the liquid crystal display device manufactured by the method.

Another aspect of the present invention is to provide a method for manufacturing a liquid crystal display panel and a liquid crystal display device including a configuration capable of decreasing the effect of the static electricity incurred when an integrated circuit is attached, and to provide the liquid crystal display panel and the liquid crystal display device manufactured by the method.

In accordance with an aspect of the present invention, there is provided a liquid crystal display device including: a first substrate including an active area and a non-active area which corresponds to a peripheral area of the active area; a static electricity absorbing pattern of a lattice pattern formed in the non-active area; and a second substrate facing the first substrate.

As described above, according to one or more embodiments of the present invention, a liquid crystal panel and a liquid crystal display device capable of decreasing an effect of static electricity are provided.

In addition, according to one or more embodiments, the present invention provides a method for manufacturing a liquid crystal display panel and a liquid crystal display device including a configuration (a static electricity dispersing configuration) for discharging static electricity incurred during a rubbing process to the outside of the liquid crystal display panel, the liquid crystal display panel and the liquid crystal display device manufactured by the method.

In addition, according to one or more embodiments, the present invention provides a method for manufacturing a liquid crystal display panel and a liquid crystal display device including a configuration (a static electricity dispersing configuration) capable of decreasing the effect of the static electricity incurred when an integrated circuit is attached, the liquid crystal display panel and the liquid crystal display device manufactured by the method.

In addition, according to one or more embodiments, the present invention provides a method for manufacturing a liquid crystal display panel and a liquid crystal display device including a configuration (a static electricity dispersing configuration) for decreasing the effect of the static electricity and aligning a liquid crystal accurately by performing a rubbing process smoothly, the liquid crystal display panel and the liquid crystal display device manufactured by the method.

BRIEF DESCRIPTION OF THE DRAWINGS

The above and other objects, features and advantages of the present invention will be more apparent from the following detailed description taken in conjunction with the accompanying drawings, in which:

FIGS. 12 to 17 are views of respective main processes in the method for manufacturing the liquid crystal display device according to an exemplary embodiment of the present invention.

DETAILED DESCRIPTION OF THE EXEMPLARY EMBODIMENTS

Figure 1:
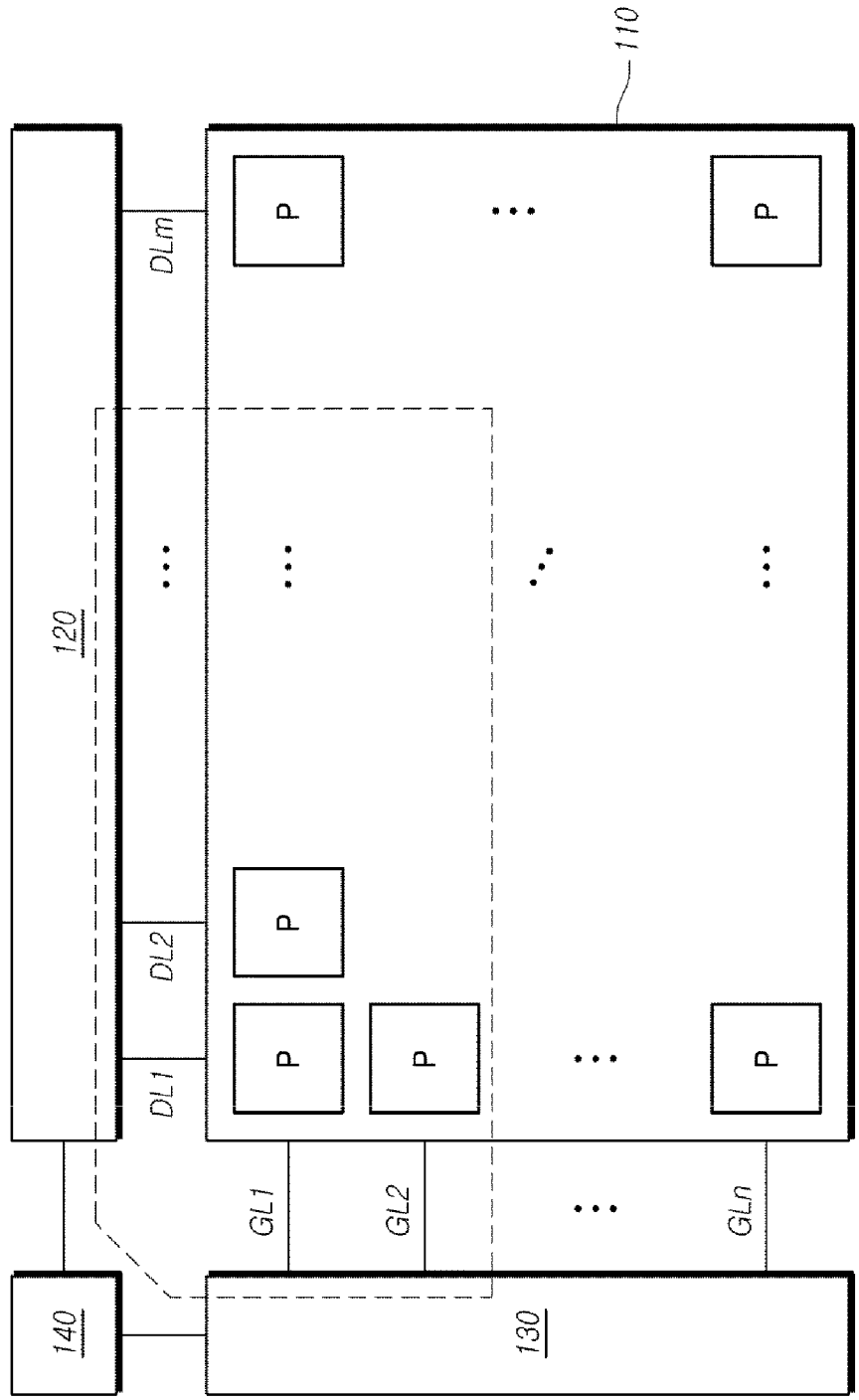
FIG. 1 is a view illustrating a simplified system of a liquid crystal display device according to an exemplary embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "interposed" between the first and second components, although the first component may be directly "connected", "coupled" or "joined" to the second component.

FIG. 1 is a view illustrating a simplified system of a liquid crystal display device 100 according to an exemplary embodiment.

Referring to FIG. 1, the liquid crystal display device 100 according to the exemplary embodiment includes a liquid crystal display panel 110, a data driving unit 120, a gate driving unit 130, a timing controller 140, and so on. All the components of the liquid crystal display device 100 are operatively coupled and configured.

In the liquid crystal display panel 110, data lines and gate lines are formed, and a sub pixel P is formed by the data lines DL1 to DLm and the gate lines GL1 to GLn. The data driving unit 120 provides data voltages for displaying an image to the data lines DL1 to DLm. The gate driving unit 130 sequentially provides scan signals to the gate lines GL1 to GLn. The timing controller 140 controls driving timings of the data driving unit 120 and the gate driving unit 130, and outputs various control signals for these controls.

In the present exemplary embodiment, the liquid crystal display panel 110 may be implemented in any known liquid crystal mode such as a Twisted Nematic (TN) mode, a Vertical Alignment (VA) mode, an In Plane Switching (IPS) mode, a Fringe Field Switching (FFS) mode, etc.

The above-mentioned data driving unit 120 may be implemented with a plurality of Data Integrated Circuits (D-ICs). Each of the data integrated circuits, e.g., may be attached to the liquid crystal display panel 110 in a Chip On Glass (COG) method, or may be integrated on the liquid crystal display panel 110.

The gate driving unit 130 may include a plurality of Gate Integrated Circuits (G-ICs). The plurality of gate integrated circuits may be connected to a bonding pad of the liquid crystal display panel 110 in a Tape Automated Bonding (TAB) method or the COG method, or may be directly formed on the liquid crystal display panel 110 in a Gate In Panel (GIP) type.

Meanwhile, the liquid crystal display panel 110 of the liquid crystal display device 100 shown in FIG. 1 includes a first substrate 210 in which a Thin Film Transistor (TFT) is formed and a second substrate 220 in which a color filter is formed, and a liquid crystal material is filled between the first substrate 210 and the second substrate 220.

Here, the first substrate 210 is refereed to as a TFT-array substrate and the second substrate 220 is referred to as a color filter substrate.

Figure 2:
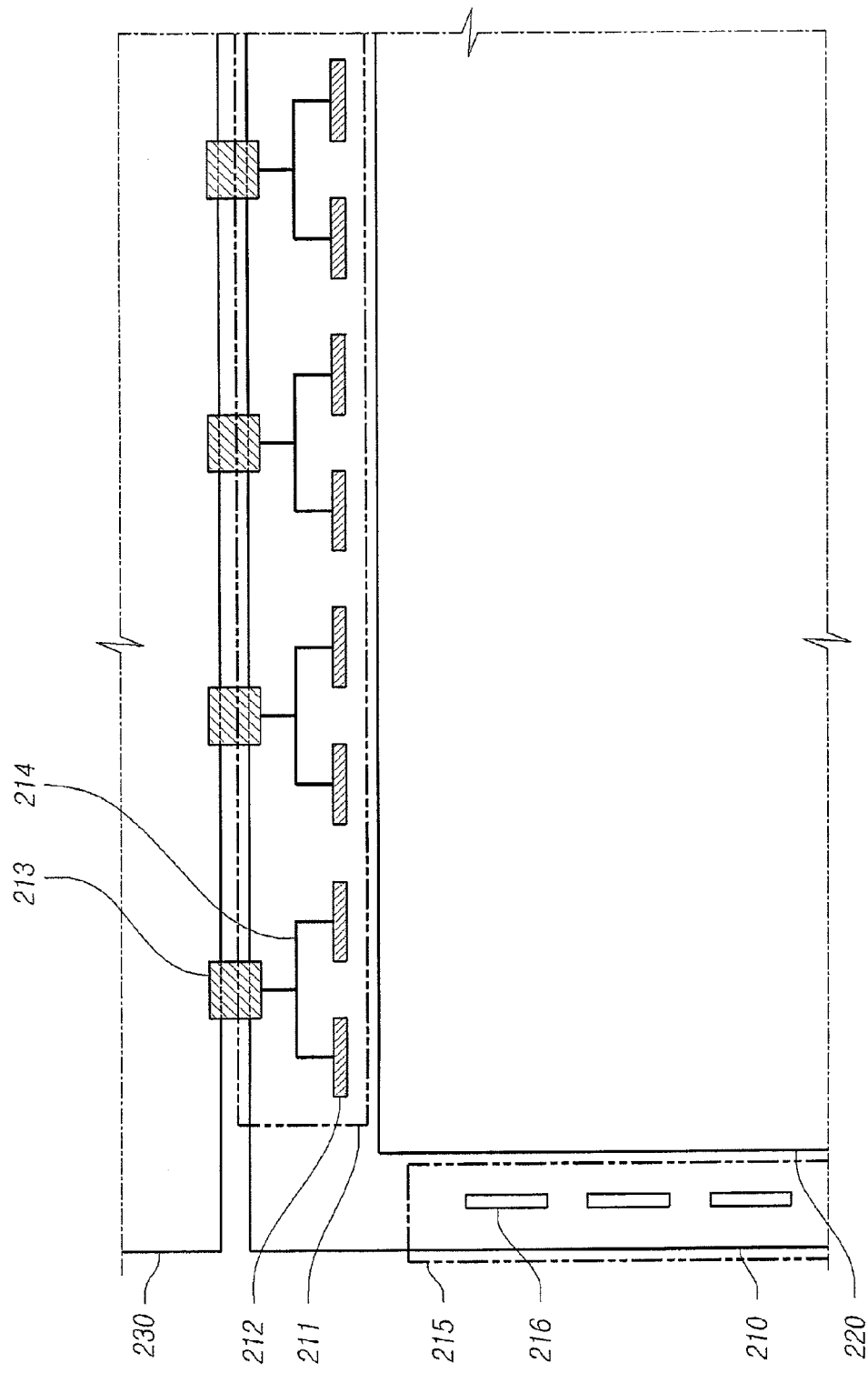
FIG. 2 is a view schematically illustrating a portion of the liquid crystal display device according to an exemplary embodiment of the present invention.

Hereinbelow, the liquid crystal display panel 110 of the liquid crystal display device 100 according to an exemplary embodiment will be described in more detail, with reference to FIG. 2 showing a portion of a dotted line box in more detail.

FIG. 2 is a view schematically illustrating a portion of the liquid crystal display device 100 according to an exemplary embodiment.

Referring to FIG. 2, the liquid crystal display panel 110 includes the first substrate 210 and the second substrate 220 facing each other. The first substrate 210 includes the active area displaying images and the non-active area which is a peripheral area of the active area.

In the active area of the first substrate 210, the data lines DL1 to DLm are formed in a first direction and the gate lines GL1 to GLn are formed in a second direction crossing the first direction. In addition, in the active area of the first substrate 210, an area where the data lines DL1 to DLm and the gate lines GL1 to GLn intersect corresponds to an area of the sub pixel P.

The TFT which is a switch device may be formed in each of the sub pixel areas. A gate electrode of the TFT formed in each of the sub pixel areas is connected to the gate line GL, a source electrode (or a drain electrode) is connected to the data line DL, and the drain electrode (or the source electrode) is connected to a pixel electrode formed with Indium Tin Oxide and so on.

The non-active area of the first substrate 210 includes a data pad portion 211, a gate pad portion 215, etc.

In the data pad portion 211 in the non-active area of the first substrate 210, two or more Flexible Printed Circuits (FPCs) 213 and a plurality of Data Integrated Circuits (D-ICs) 212 may be located. The above-mentioned FPC 213 may be a flexible printed circuit film or a Flexible Printed Circuit Board (FPCB).

Describing in more detail, in the data pad portion 211, the plurality of data integrated circuits 212 are attached to the data pad formed on the first substrate 210.

Meanwhile, the plurality of data integrated circuits 212 may include N number of grouped data integrated circuits. The 'N' which is a number of the data integrated circuits included in a data integrated circuit group may be a natural number equal to or larger than 2. FIG. 2 is a view illustrating a case wherein N is 2.

The N number of data integrated circuits included in each of the data integrated circuit groups including the N number of data integrated circuits are connected to one FPC together through a line 214.

That is, in the data pad portion 211 of the first substrate 210, an FPC to which the N number of data integrated circuits included in each of the grouped data integrated circuit groups are connected together is located at each of the integrated circuit groups.

Referring to FIG. 2, one terminal of the FPC is connected to one side of the first substrate 210, and another terminal of the FPC is connected to a printed circuit board 230 where various circuit parts are located.

Referring to FIG. 2, in the non-active area of the first substrate 210, a plurality of gate integrated circuits 216 attached to a gate pad may be formed in the gate pad portion 215.

Meanwhile, in the active area of the first substrate 210, an alignment layer may be formed on the TFT and the pixel electrode, after the TFT and the pixel electrode are formed. A rubbing is processed on a surface of the alignment layer, and the alignment layer aligns a liquid crystal molecule in a certain direction.

For example, Polylmide (PI) group and so on are mainly used as a material of the alignment layer. In addition, for example, the material of the alignment layer may include at least one of a compound of polyimide, polyamic acid, polyvinylcinnamate, polyazobenzene, polyethyleneimine, polyvinyl alcohol, polyamide, polyethylene, polystylene, polyphenylenephthalamide, polyester, polyurethane, polysiloxanecinnamate, cellulosecinnamate and polymethyl methacrylate groups.

Meanwhile, when the liquid crystal display panel 110 is manufactured, in order to form the alignment layer, it is necessary to perform the rubbing process for rubbing a surface of the spread alignment layer material with a rubbing cloth and so on to align a high molecule chain of the surface of the alignment layer material, thereby determing the alignment direction of the liquid crystal molecule.

During such a rubbing process, static electricity may be incurred.

The static electricity incurred during the above rubbing process, damages the active area of the liquid crystal display panel 110, and thus the static electricity may cause a line defect and so on. For example, the static electricity incurred during the rubbing process may damage the TFT playing a role as a switching of the sub pixel in the active area, or may cause a short circuit of the gate line or the data line.

Thus, the static electricity incurred during the rubbing process is one of critical problems decreasing manufacturing throughput of the liquid crystal display panel 110.

The liquid crystal display panel 110 of the liquid crystal display device 100 according to the present exemplary embodiment is a panel manufactured through the rubbing process, in a state wherein a configuration for discharging the static electricity that is generated in the rubbing process step to the outside is formed in advance (e.g., before the rubbing process).

Figure 15:
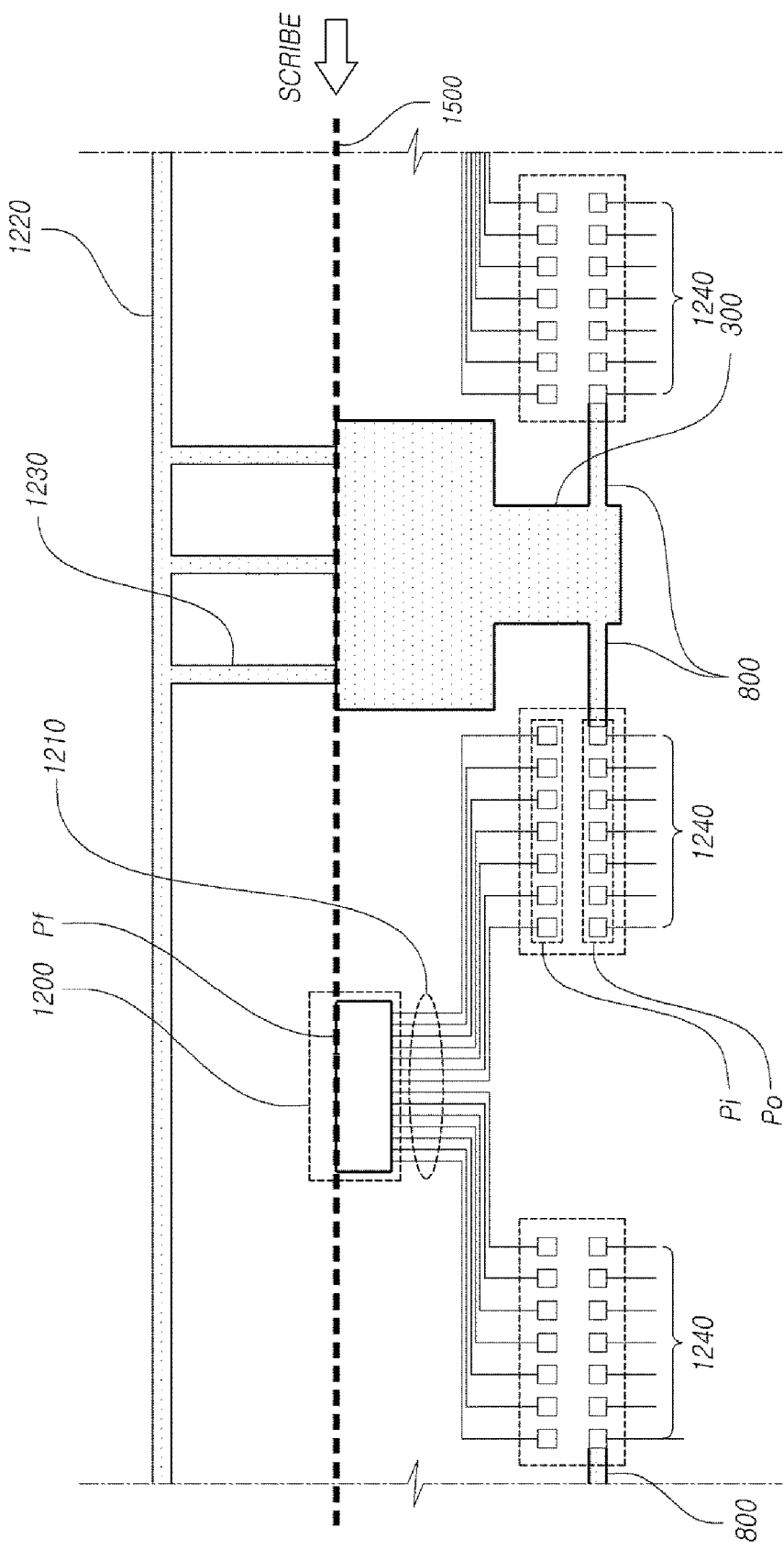
Figure 16:
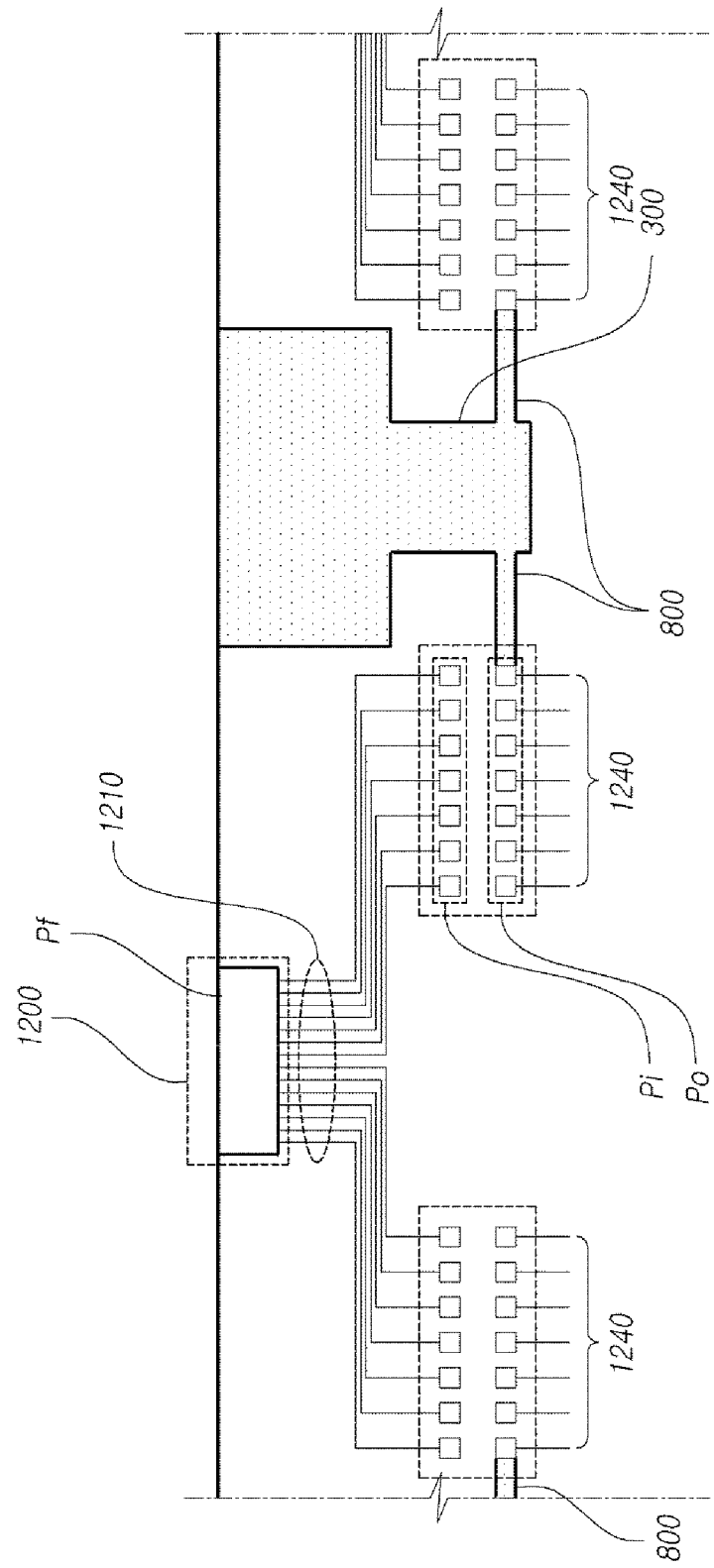
Figure 17:
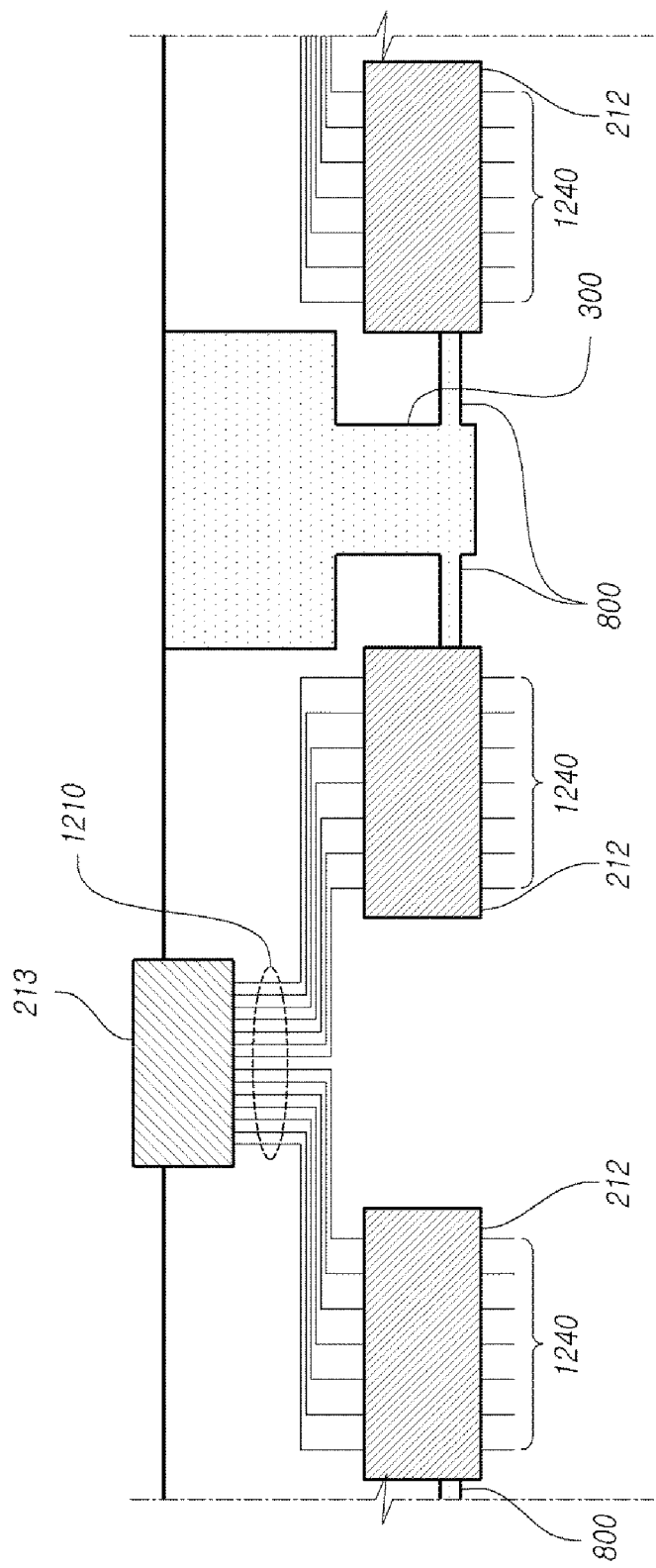

Thus, in the liquid crystal display panel 110 of the liquid crystal display device 100, after the liquid crystal display panel 110 is manufactured, a portion of the configuration, e.g., the static electricity absorbing pattern and so on, discharging the static electricity incurred in the rubbing process step to the outside may remain, and the rest may be eliminated by a scribe process (refer to FIG. 15).

Hereinbelow, the liquid crystal display panel 110 of the liquid crystal display device 100 according to the present exemplary embodiment having the portion of the configuration, e.g., the static electricity absorbing pattern and so on, discharging the static electricity incurred in the rubbing process step to the outside, after the panel is manufactured, is described in more detail with reference to FIGS. 3 to 7.

Figure 3:
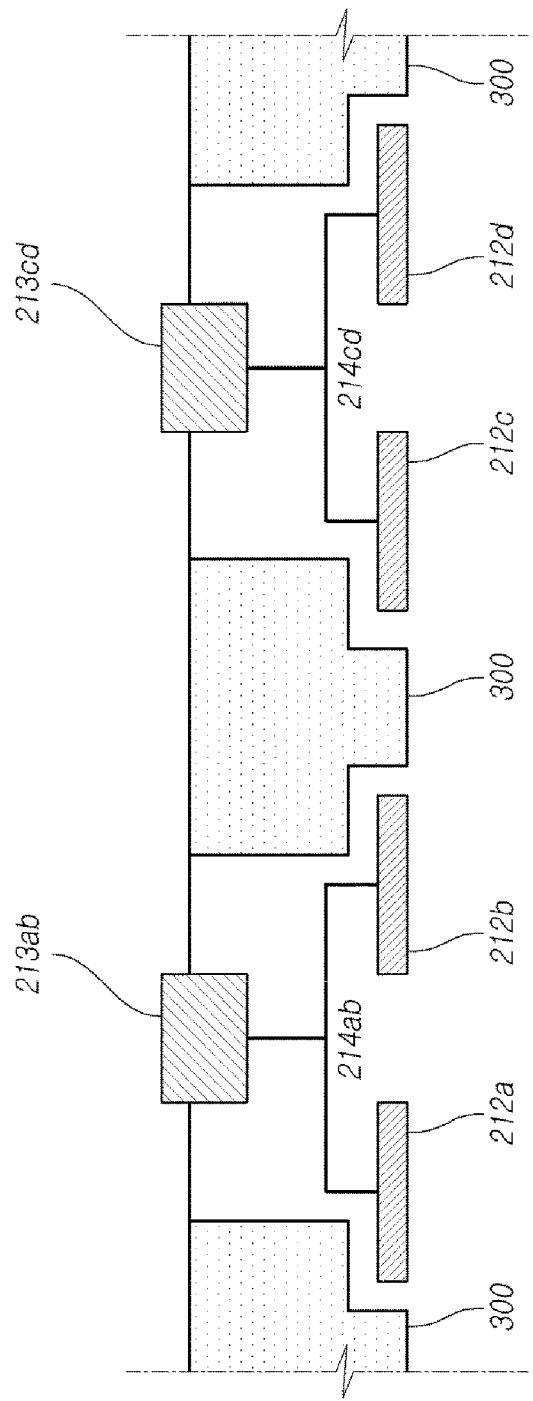
FIG. 3 is a view illustrating a non-active area of the first substrate in a liquid crystal display panel of the liquid crystal display device and a static electricity absorbing pattern formed in the non-active area according to an exemplary embodiment of the present invention.

FIG. 3 is a view illustrating a portion of the non-active area of the first substrate 210 in the liquid crystal display panel of the liquid crystal display device 100 and a static electricity absorbing pattern 300 of the lattice pattern formed in the non-active area according to an exemplary embodiment.

FIG. 3 is a view illustrating only a portion where four data integrated circuits 212a, 212b, 212c and 212d are located in the data pad portion 211 of the non-active area of the first substrate 210 in the liquid crystal display panel of the liquid crystal display device 100 shown in FIG. 2.

Referring to FIG. 3, the first substrate 210 includes the active area and the non-active area which is the peripheral area of the active area.

In the non-active area of the first substrate 210, the plurality of data integrated circuits 212a, 212b, 212c, 212d, . . . and two or more flexible printed circuits 213ab, 213cd, . . . are located.

A number of two or more flexible printed circuits 213ab, 213cd, . . . is identical to a number of a data integrated circuit group. That is, when M number of data integrated circuits 212a, 212b, 212c, 212d, . . . are grouped by N number, the number of the data integrated circuits is M/N, and the number of the flexible printed circuits is also M/N. FIG. 3 is a view illustrating a case wherein N=2, i.e. a case wherein the plurality of data integrated circuits 212a, 212b, 212c, 212d, . . . are grouped by two data integrated circuits.

Referring to FIG. 3, each of the flexible printed circuits 213ab, 213cd, . . . to which N number of data integrated circuits belonging to each of the data integrated circuit groups including N number of data integrated circuits among the plurality of data integrated circuits 212a, 212b, 212c, 212d, . . . are connected together are located at each of the data integrated circuit groups.

That is, referring to an example of FIG. 3, a left flexible printed circuit 213ab corresponds to a data integrated circuit group in which two left data integrated circuits 212a and 212b are included. The two left data integrated circuits 212a and 212b are connected together to the left flexible printed circuit 213ab through a line 214ab.

In addition, referring to the example of FIG. 3, a right flexible printed circuit 213cd corresponds to another data integrated circuit group in which two right data integrated circuits 212c and 212d are included. The two right data integrated circuits 212c and 212d are connected together to the right flexible printed circuit 213cd through a line 214cd.

Meanwhile, referring to FIG. 3, a static electricity absorbing pattern 300 is formed in an area where the plurality of data integrated circuits 212a, 212b, 212c, 212d, . . . and two or more flexible printed circuits 213ab, 213cd, . . . are not located in the non-active area of the first substrate 210 in the liquid crystal display panel 110.

Referring to FIG. 3, the static electricity absorbing pattern 300 may be formed in a peripheral area of the area where the flexible printed circuits 213ab, 213cd, . . . are located. For example, the static electricity absorbing pattern 300 may be formed in each of spaces between the data integrated circuit groups.

Thus, in an edge area of the first substrate 210, one of the flexible printed circuits 213ab, 213cd, . . . and one static electricity absorbing pattern 300 are alternately formed.

That is, as shown in FIG. 3, one flexible printed circuit 213ab is formed next to one static electricity absorbing pattern 300, one static electricity absorbing pattern 300 is formed next to the flexible printed circuit 213ab, one flexible printed circuit 213cd is formed next to the static electricity absorbing pattern 300, and one static electricity absorbing pattern 300 is formed next to the flexible printed circuit 213cd.

The static electricity absorbing pattern 300 shown in FIG. 3 is a portion of a remainder, among configurations for discharging the static electricity incurred in the rubbing process step to the outside, after the liquid crystal display panel 100 is manufactured.

The configuration for discharging the static electricity incurred in the rubbing process step to the outside will be described in detail, when a method for manufacturing the liquid crystal display device 100 is described with reference to FIGS. 11 to 17.

Hereinafter, the static electricity absorbing pattern 300 shown in FIG. 3 will be described in more detail with reference to FIGS. 4 to 7.

FIGS. 4 to 7 are views illustrating the static electricity absorbing pattern 300 formed in the non-active area of the first substrate 210 in the liquid crystal display panel of the liquid crystal display device 100 in more detail.

Figure 4:
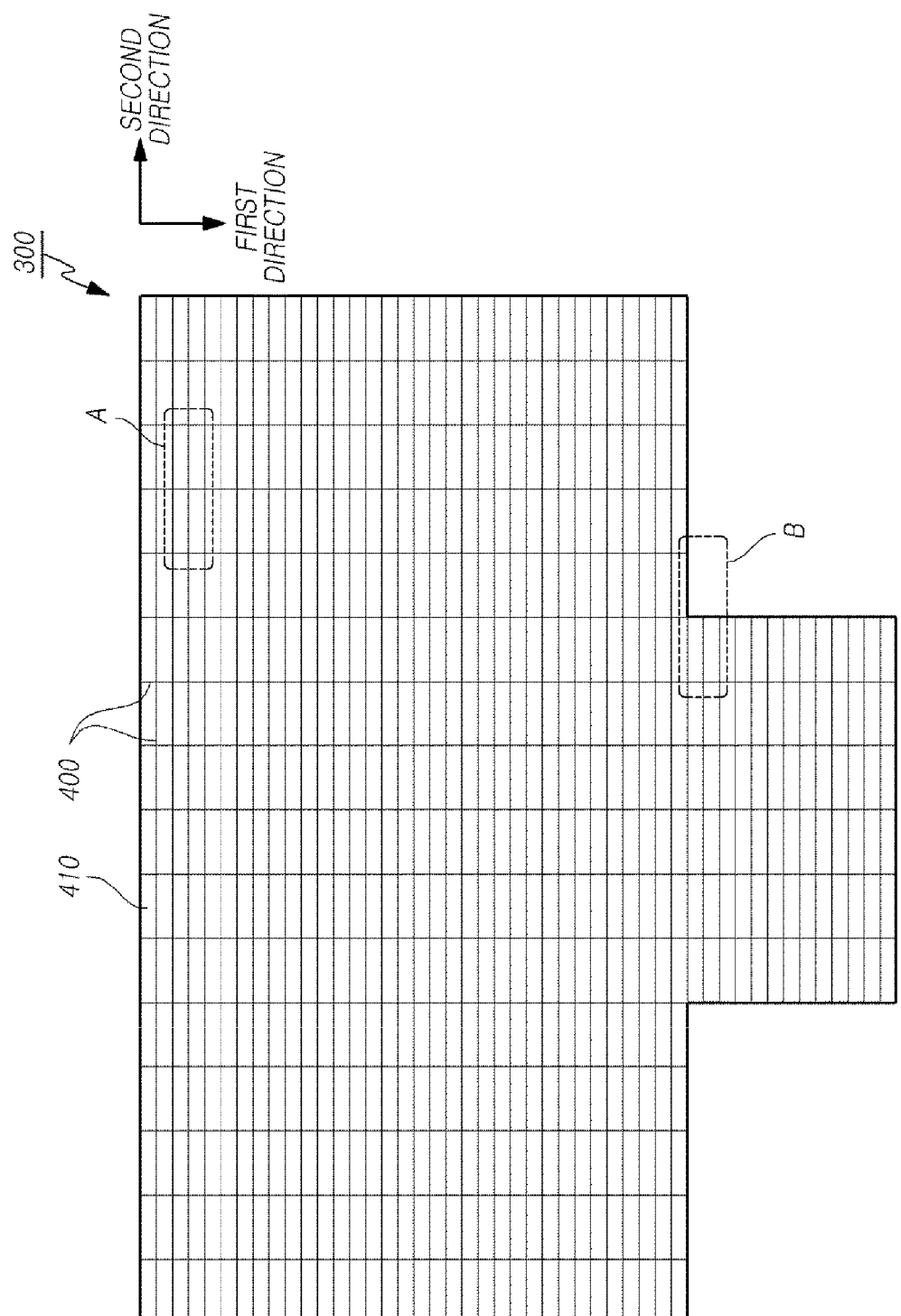
FIGS. 4 to 7 are views illustrating the static electricity absorbing pattern of a lattice pattern formed in the non-active area of the first substrate in the liquid crystal display panel of the liquid crystal display device in more detail according to an embodiment of the present invention.
Figure 5:
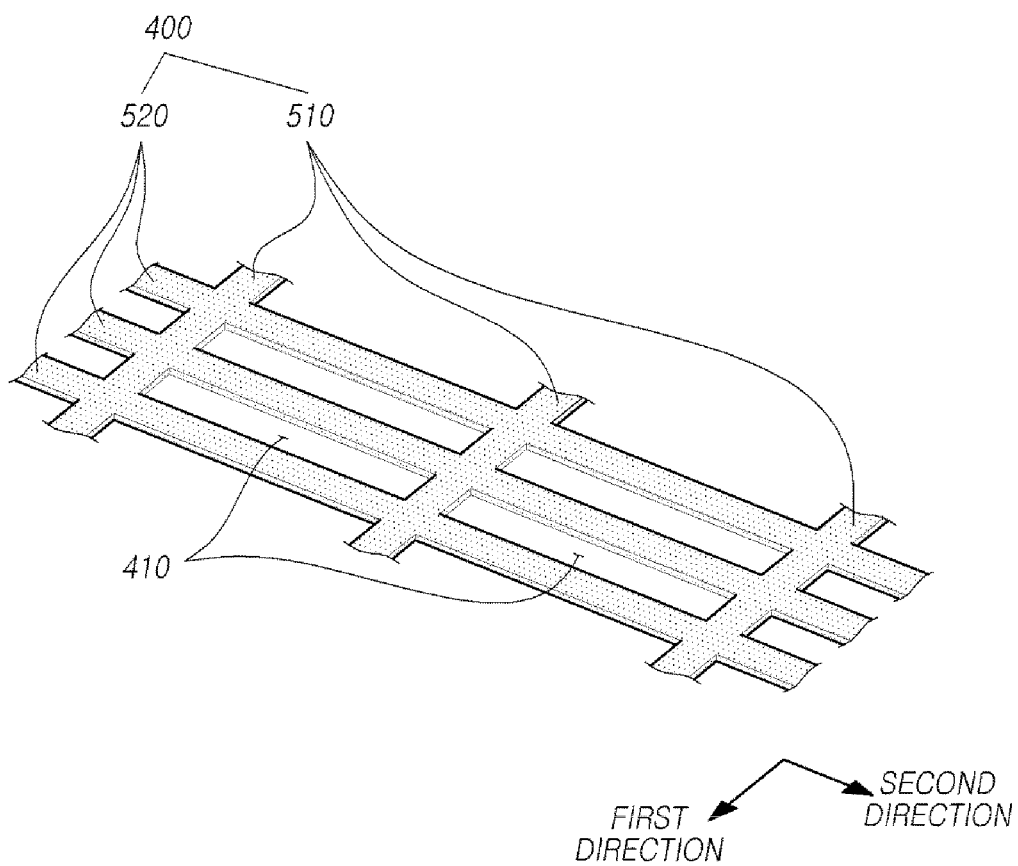
Figure 6:
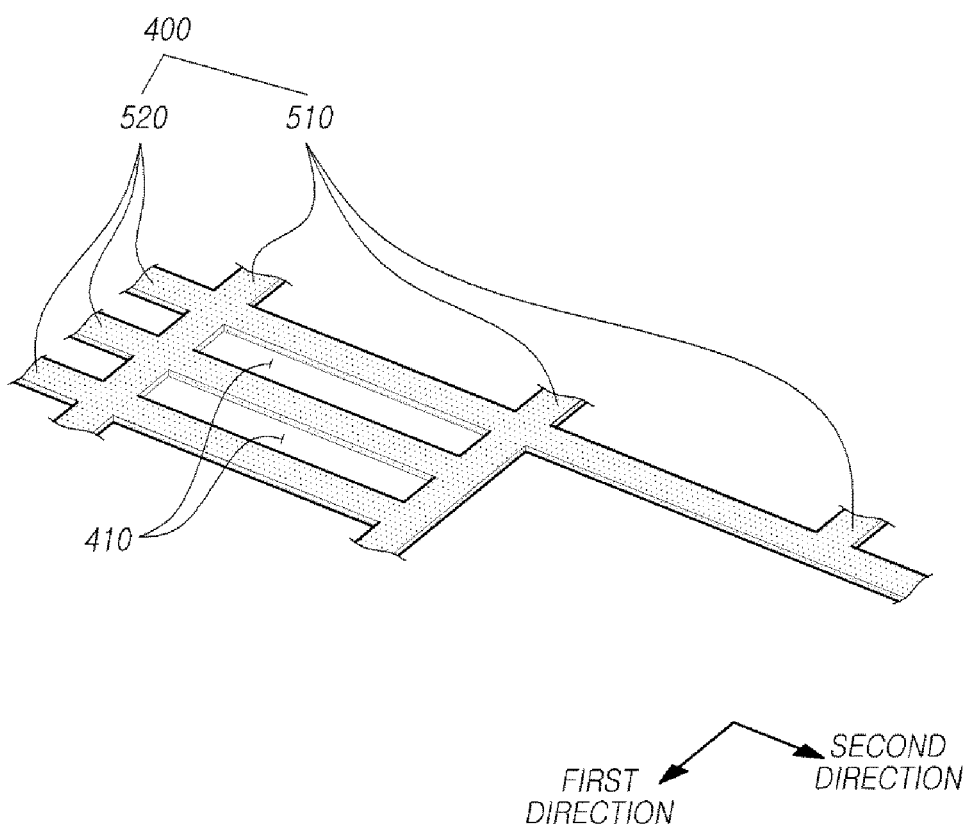
Figure 7:
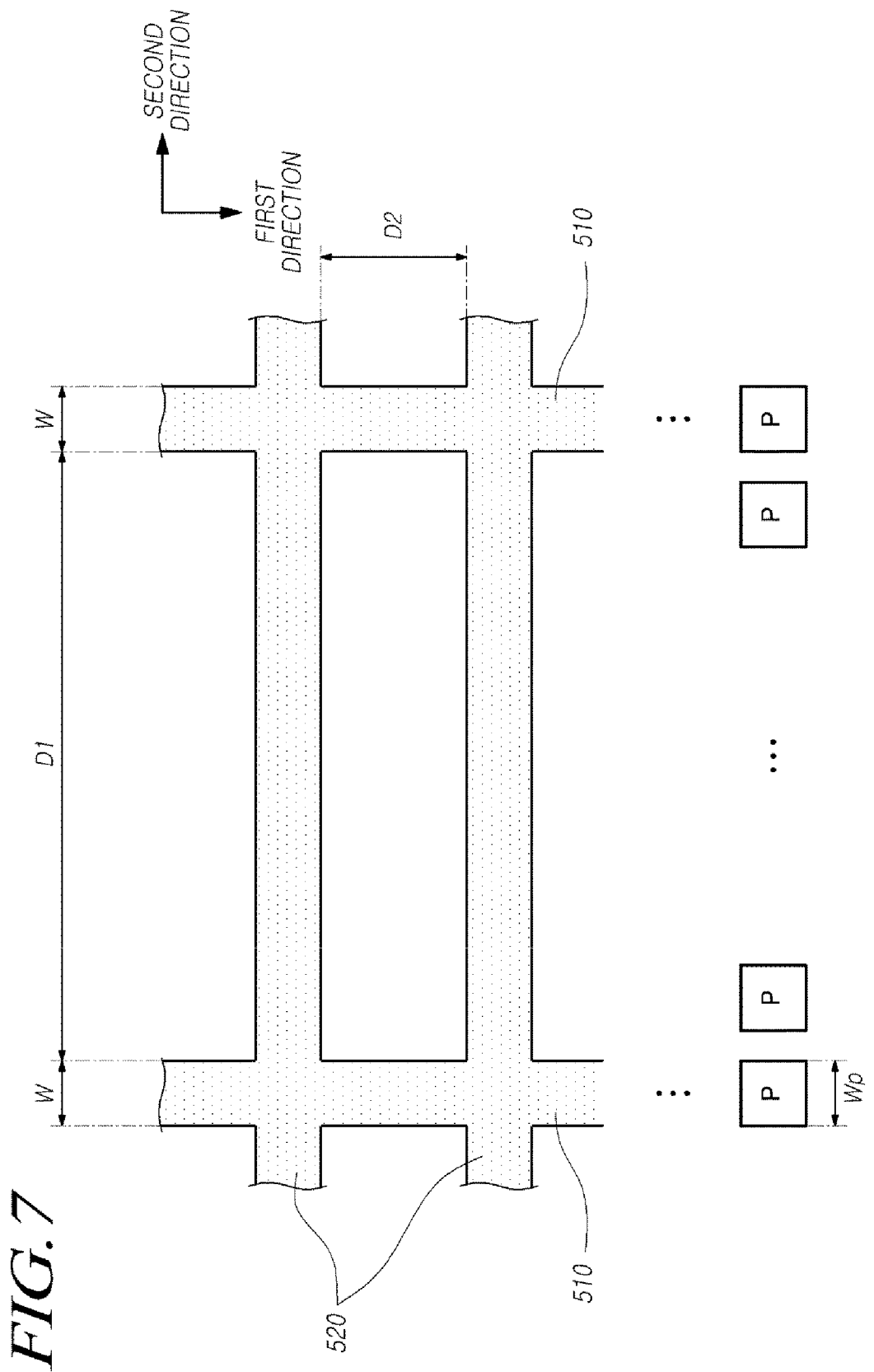

FIG. 4 is a view illustrating the static electricity absorbing pattern 300 formed in the non-active area of the first substrate 210 in the liquid crystal display panel of the liquid crystal display device 100 according to an exemplary embodiment, FIGS. 5 and 6 are enlarged views showing portions A and B in FIG. 4 in three dimensions, and FIG. 7 is a view for describing an additional structural feature of the static electricity absorbing pattern 300.

The static electricity absorbing pattern 300 formed in the area where the plurality of data integrated circuits 212a, 212b, 212c, 212d, . . . and two or more flexible printed circuits 213ab, 213cd, . . . are not located in the non-active area of the first substrate 210 in the liquid crystal display panel 110, may be formed without a groove in the whole surface, and a protrusion portion by a plurality of grooves may be formed in a lattice pattern in the static electricity absorbing pattern 300, as shown in FIG. 4.

That is, referring to FIG. 4, the static electricity absorbing pattern 300 may be formed in the lattice pattern.

Referring to FIGS. 4 to 6, in the static electricity absorbing pattern 300, one protrusion portion 400 protruded by the plurality of grooves 410 is formed, and the protrusion portion 400 has the lattice pattern.

In FIG. 4, a line corresponds to the protrusion portion 400, and a space enclosed by the line corresponds to the groove 410.

Referring to FIGS. 4 to 6, one protrusion portion 400 includes first protrusion portions 510 protruded in a first direction, e.g., a vertical direction, and spaced apart from each other, and second protrusion portions 520 crossing the first protrusion portions 510, protruded in a second direction, e.g., a horizontal direction, and spaced apart from each other.

Referring to FIGS. 4 to 6, the second direction of the second protrusion portions 520 may be a direction crossing a rubbing direction of the alignment layer surface of the first substrate 210.

Here, the rubbing direction may be checked through a structure of a groove formed on the alignment layer surface.

For example, the first direction of the first protrusion portions 510 may be identical to the rubbing direction, and the second direction of the second protrusion portions 520 may cross the rubbing direction.

Referring to FIG. 4, it is assumed that the data pad portion 211 is at a top side in the non-active area, the active area is under the data pad portion 211, and a border shape of each of the static electricity absorbing patterns 300 may be a T shape.

Meanwhile, the static electricity absorbing patterns 300 may include material identical to material of the pixel electrode connected to the drain electrode (or source electrode) of the TFT in each of the sub pixel areas of the active area.

For example, when the material of the pixel electrode is Indium Tin Oxide (ITO), the material of the static electricity absorbing patterns 300 may be Indium Tin Oxide (ITO).

As described above, forming the static electricity absorbing patterns 300 with the material identical to the material of the pixel electrode, means the static electricity absorbing patterns 300 may be formed along with the pixel electrode, when the pixel electrode is formed.

In addition, the static electricity absorbing patterns 300 may be an electrically disconnected floating pattern.

Meanwhile, referring to FIGS. 4 to 7, the static electricity absorbing pattern 300 may be formed with the protrusion portion 400 of the lattice pattern by the plurality of grooves 410, alternatively, distances D2 of each of the second protrusion portions 520 of the second direction crossing, e.g., intersecting, the rubbing direction are very narrow, or the whole surface of the static electricity absorbing pattern 300 may be protruded.

In this case, a cloth such as a rubbing cloth and the like on a rubbing roller is bent by a protruded surface of the static electricity absorbing pattern 300 for a very long time in the rubbing process. Thus, a force of restitution, i.e. force of unfolding the cloth such as the rubbing cloth and the like of the rubbing roller after the cloth is bent, is decreased, and this phenomenon is referred to as "memory phenomenon of rubbing roller" (refer to FIG. 14).

Such a memory phenomenon of the rubbing roller, when the static electricity absorbing pattern 300 is rubbed, and the surface of the alignment layer material is rubbed, may cause a problem of non-uniform rubbing on the surface of the alignment layer material.

Due to such non-uniform rubbing, a rubbing track of the first direction, e.g., the vertical direction, may not be uniform, an alignment of the liquid crystal may not be normal, and thus a critical defect of the liquid crystal display panel may be caused.

Thus, in the present exemplary embodiment, as shown in FIGS. 4 to 7, the static electricity absorbing pattern 300 of the lattice pattern formed with the protrusion portion 400 including the first protrusion portions 510 of the first direction and the second protrusion portions 520 of the second direction by the plurality of grooves is formed.

Therefore, in the present exemplary embodiment, when a rubbing is performed along the long first protrusion portions 510 of the first direction, e.g., the vertical direction, of the static electricity absorbing pattern 300, the memory phenomenon, identical to a case wherein the whole surface of the static electricity absorbing pattern 300 is protruded, may occur, but when the rubbing is performed along the long second protrusion portions 520 of the second direction, e.g., the horizontal direction, of the static electricity absorbing pattern 300, the memory phenomenon may be decreased or prevented.

Referring to FIG. 7, when the rubbing roller rubs the protruded surface of the second protrusion portions 520 through the second protrusion portions 520 of the second direction spaced apart from each other by a D2 distance due to the plurality of grooves 410, bending the cloth of the rubbing roller at the second protrusion portion 520 and unfolding the cloth of the rubbing roller at the groove 410 are repeated, and thus the force of restitution is not decreased.

Therefore, when the cloth of the rubbing roller rubs the surface of the alignment layer material following the static electricity absorbing pattern 300, the cloth of the rubbing roller may rub the surface of the alignment layer material in uniform intensity.

Thus, according to the embodiments of the present invention, the uniform rubbing track of which a depth, a width and so on are uniform exists on the alignment layer material, and resultantly, a normal alignment of the liquid crystal may be performed.

Referring to FIG. 7, with related to these points, each of widths W of the first protrusion portions 510 of the first direction of the static electricity absorbing pattern 300 may be equal to or narrower than a width Wp of the sub pixel, so that the static electricity absorbing pattern 300 discharges the static electricity to the outside and minimizes the memory phenomenon.

In addition, each of the distances D1 of the first protrusion portions 510 of the first direction of the static electricity absorbing pattern 300, in order to decrease a number of lines of the first direction incurring the memory phenomenon, may be as wide as possible, within a scope wherein the static electricity absorbing pattern 300 sufficiently discharges the static electricity to the outside. That is, a number of the first protrusion portions 510 of the first direction of the static electricity absorbing pattern 300 may be as small as possible within the scope wherein the static electricity absorbing pattern 300 sufficiently discharges the static electricity to the outside.

Referring to FIG. 7, the distance D2 between the second protrusion portions 520 protruded in the second direction, e.g., the horizontal direction, may be narrower than the distance D1 between the first protrusion portions 510 protruded in the first direction, e.g., the vertical direction (D2<D1).

Due to the structural feature of the above-mentioned static electricity absorbing pattern 300, each of widths W of the first protrusion portions 510 protruded in the first direction, e.g., the vertical direction, of the static electricity absorbing pattern 300 is equal to or narrower than the width Wp of the sub pixel P, and thus when the rubbing is processed, the area where the memory effect (refer to FIG. 14) of the rubbing roller incurred by the first protrusion portions protruded in the first direction, e.g., the vertical direction, of the static electricity absorbing pattern 300 may be limited to only the sub pixel corresponding to the first protrusion portions 510 protruded in the first direction. That is, if although a portion of the rubbing cloth is damaged due to the memory effect of the rubbing cloth, the damaged rubbing cloth damages one sub pixel line successively, and thus a horizontal pattern defect due to the rubbing cloth may be minimized.

Meanwhile, a value of the distance D2 between the second protrusion portions 520 protruded in the second direction, e.g., the horizontal direction, may be a designed value so that the memory effect of the rubbing roller by the second protrusion portions 520 protruded in the second direction, e.g., the horizontal direction, of the static electricity absorbing pattern 300, is not incurred (refer to FIG. 14).

Thus, because of the structural feature of the above-mentioned static electricity absorbing pattern 300, the rubbing process is smoothly performed while decreasing the effect of the static electricity, and thus the alignment of the liquid crystal may be performed accurately.

Meanwhile, during the manufacturing of the liquid crystal display device 100, when the Data Integrated Circuit (D-IC) is attached on the data pad formed in the non-active area of the first substrate 210 in a Chip On Glass (COG) method, the static electricity may be incurred, and this static electricity may damage a circuit configuration of the liquid crystal display device 100 and cause a defect of the circuit configuration of the liquid crystal display device 100.

Thus, the static electricity incurred in the attaching process of the Data Integrated Circuit (D-IC) may decrease manufacturing throughput of the liquid crystal display device 100.

The liquid crystal display panel 110 of the liquid crystal display device 100 according to the present exemplary embodiment may include a configuration for dispersing the static electricity incurred in a step of attaching the Data Integrated Circuit (D-IC). Because of such static electricity dispersing configuration, although the static electricity is incurred in the step of attaching the Data Integrated Circuit (D-IC), damage due to the incurred static electricity may be minimized.

Hereinbelow, the liquid crystal display panel 110 of the liquid crystal display device 100 according to the present exemplary embodiment having the configuration, e.g., a connection pattern 800 and so on, of dispersing the static electricity incurred in the step of attaching the Data Integrated Circuit (D-IC) will be described in more detail with reference to FIGS. 8 to 10.

Figure 8:
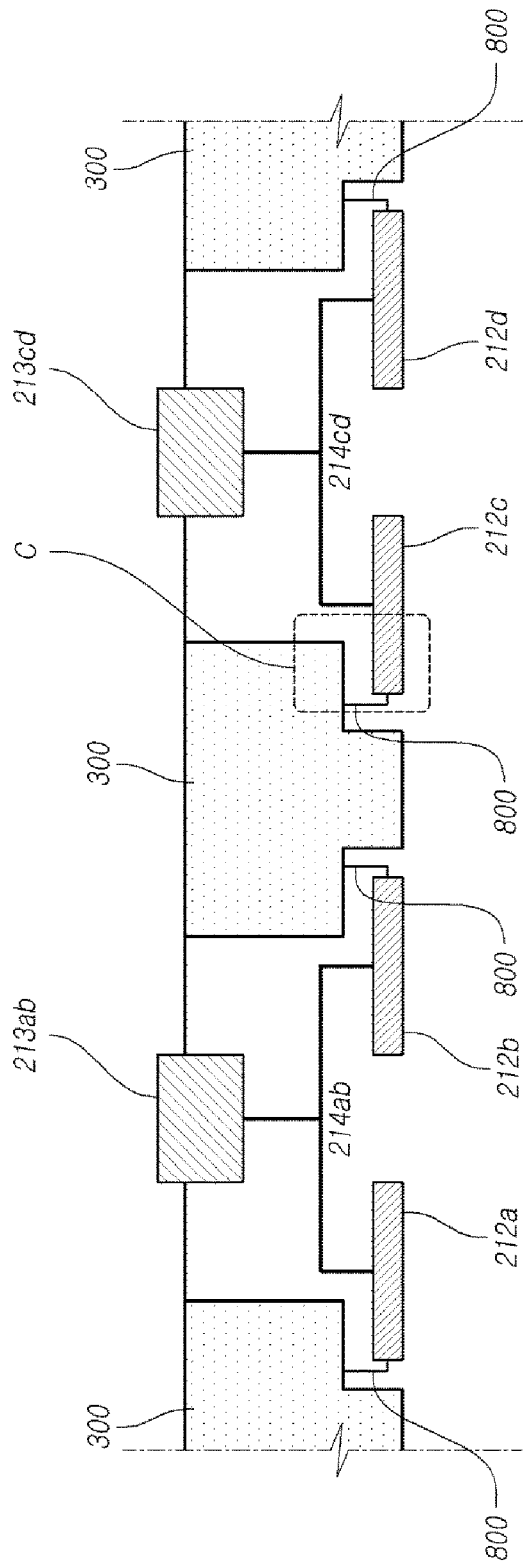
FIG. 8 is a view illustrating the non-active area of the first substrate in the liquid crystal display panel of the liquid crystal display device and a connection pattern further formed in the non-active area according to an exemplary embodiment of the present invention.

FIG. 8 is a view illustrating the non-active area of the first substrate 210 in the liquid crystal display panel of the liquid crystal display device 100 and the connection pattern 800 further formed in the non-active area according to an exemplary embodiment.

Referring to FIG. 8, in the first substrate 210, the connection pattern 800 electrically connecting the data integrated circuits 212a, 212b, 212c, 212d, . . . adjacent to the static electricity absorbing pattern 300 with the static electricity absorbing pattern 300 may be additionally formed.

The connection pattern 800 disperses the static electricity incurred in the data integrated circuits 212a, 212b, 212c, 212d, . . . to the static electricity absorbing pattern 300 with which the data integrated circuits 212a, 212b, 212c, 212d, . . . are connected.

Referring to FIG. 8, the connection pattern 800 is located at each of the data integrated circuits 212a, 212b, 212c, 212d, . . . .

A connection structure of the data integrated circuits 212a, 212b, 212c, 212d, . . . and the static electricity absorbing pattern 300 by the connection pattern 800 in FIG. 8 will be described in more detail with reference to FIGS. 9 and 10.

Figure 9:
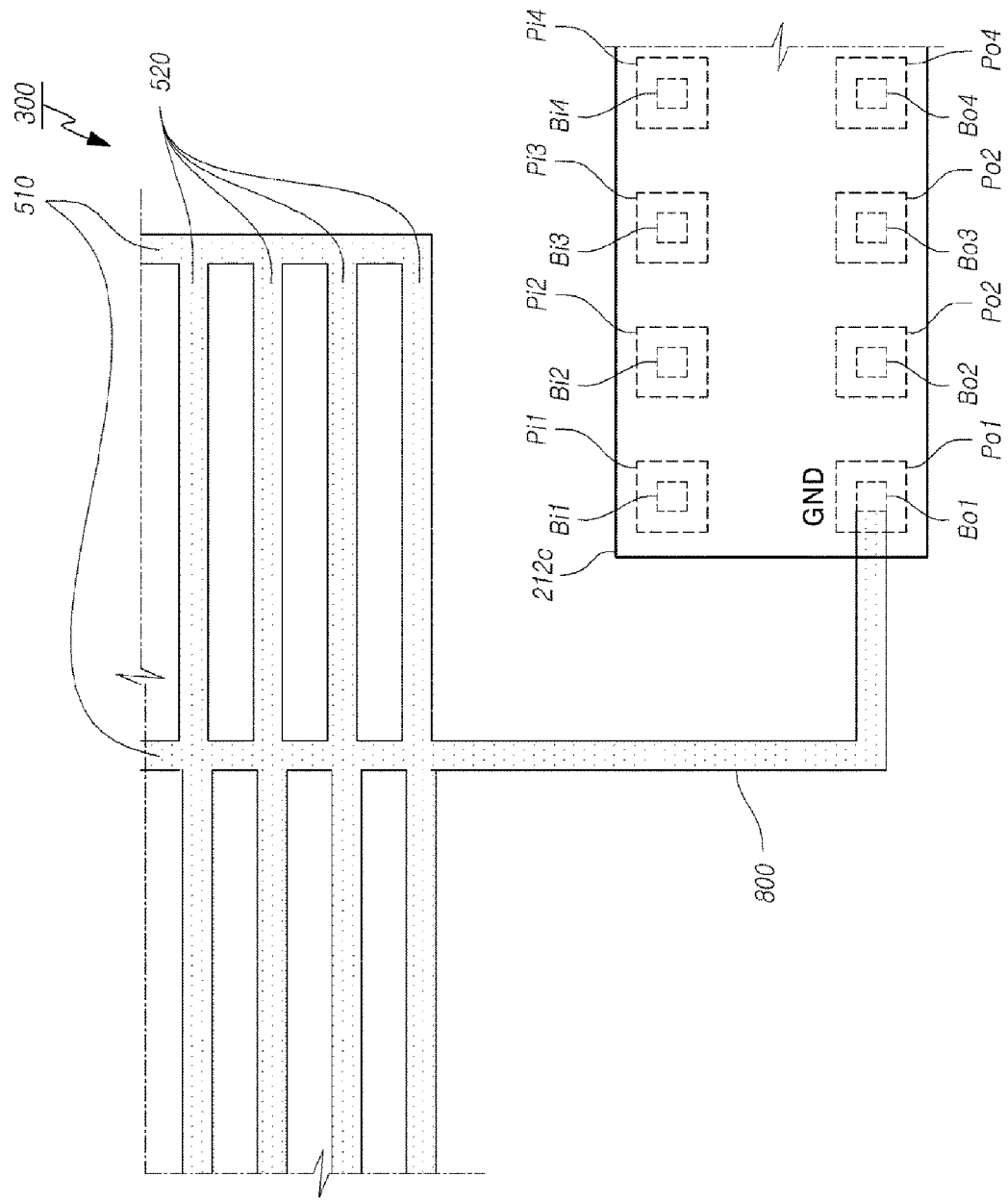
FIGS. 9 and 10 are views illustrating the connection pattern further formed in the non-active area of the first substrate in the liquid crystal display panel of the liquid crystal display device according to an exemplary embodiment, and an electrical connection structure of the static electricity absorbing pattern and an integrated circuit through the connection pattern according to an embodiment of the present invention.
Figure 10:
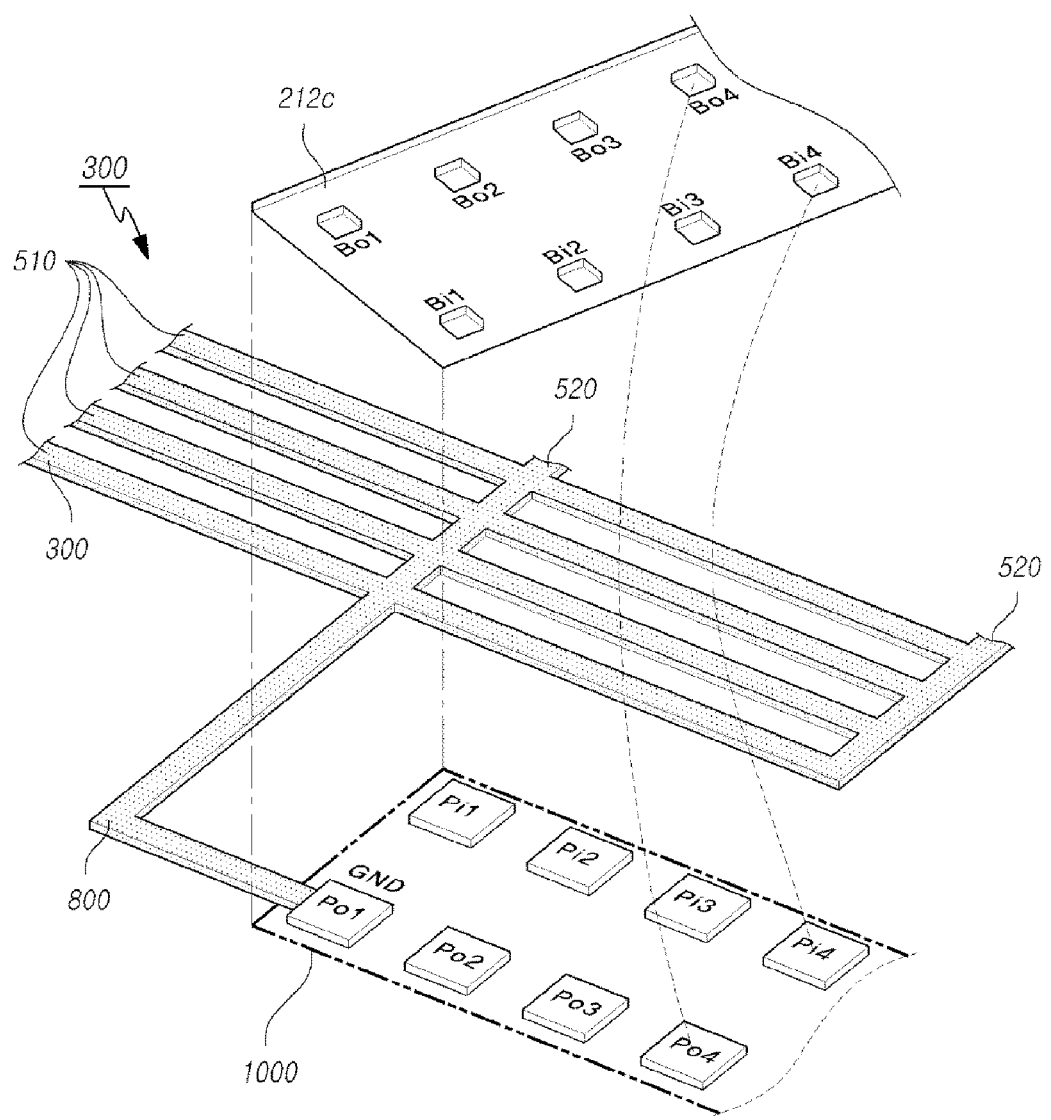

FIGS. 9 and 10 are enlarged views showing a portion C in FIG. 8, and are views illustrating the connection pattern 800 further formed in the non-active area of the first substrate 210 in the liquid crystal display panel of the liquid crystal display device 100 according to an exemplary embodiment, and the electrical connection structure of the static electricity absorbing pattern 300 and the data integrated circuit 212c through the connection pattern 800.

FIG. 9 is a view showing a state when the data integrated circuit 212c is mounted in a corresponding area 1000, and FIG. 10 is a view showing a state before the data integrated circuit 212c is mounted in the corresponding area 1000.

Referring to FIGS. 9 and 10, input terminals of the data integrated circuit 212c are connected to input pads Pi1, Pi2, Pi3, Pi4, . . . formed in the first substrate 210 through input side bumpers Bi1, Bi2, Bi3, Bi4, . . . , output terminals of the data integrated circuit 212c are connected to output pads Po1, Po2, Po3, Po4, . . . formed in the first substrate 210 through output side bumpers Bo1, Bo2, Bo3, Bo4, . . . , and thus the data integrated circuit 212c is mounted on the corresponding area 1000.

Referring to FIGS. 9 and 10, the connection pattern 800 connects a specific bumper Bo1 of the data integrated circuit 212c adjacent to the static electricity absorbing pattern 300 with the static electricity absorbing pattern 300.

The specific bumper Bo1 of the data integrated circuit 212c connected to the connection pattern 800 is a bumper connecting a ground terminal GND of the data integrated circuit 212c to which the connection pattern 800 is connected with the output pad Po1. That is, the connection pattern 800 may be formed by connection to the output pad Po1 connected to the ground terminal GND of the data integrated circuit 212c.

Meanwhile, the connection pattern 800 may include material identical to the material of the pixel electrode such as Indium Tin Oxide (ITO) and so on.

In the above, the liquid crystal display device 100 and the liquid crystal display panel 110 thereof according to an exemplary embodiment including the configuration for dispersing the static electricity incurred in the rubbing process and the data integrated circuit attaching process are described.

Hereinbelow, a method for manufacturing the liquid crystal display device 100 and the liquid crystal display panel 110 thereof will be described with reference to FIGS. 11 to 17.

Figure 11:
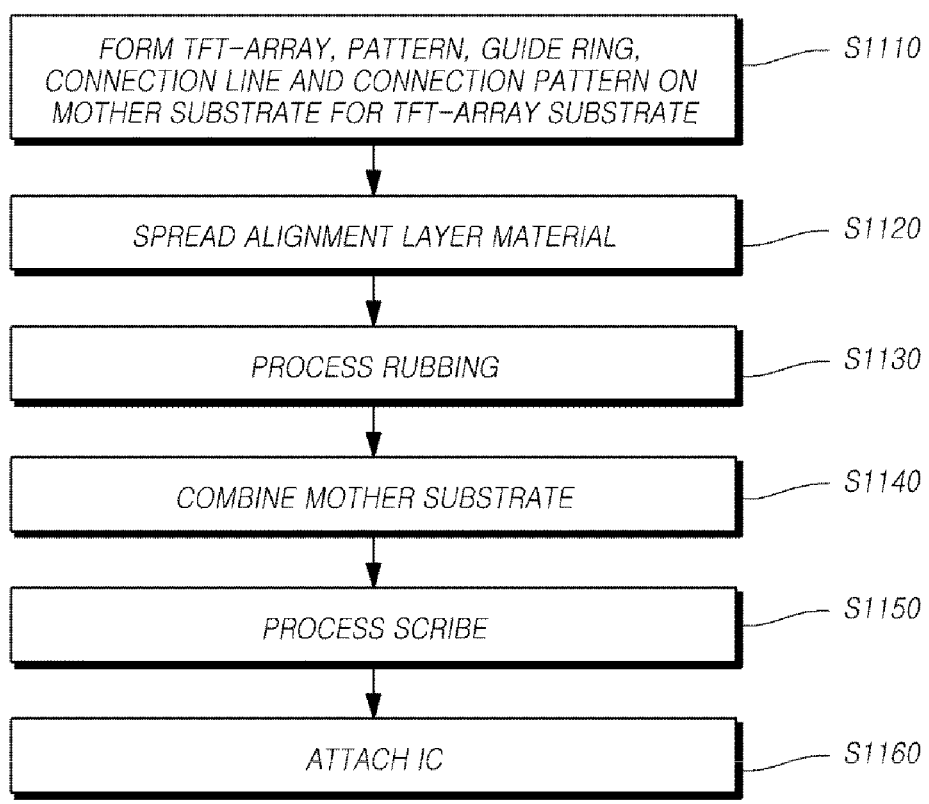
FIG. 11 is a schematic flowchart illustrating a method for manufacturing the liquid crystal display device according to an exemplary embodiment of the present invention.

FIG. 11 is a schematic flowchart illustrating the method for manufacturing the liquid crystal display device 100 according to an exemplary embodiment.

Referring to FIG. 11, the method for manufacturing the liquid crystal display device 100 includes forming the TFT-array on a mother substrate for TFT-array substrate (S1110), spreading the alignment layer material such as polyimide and so on for forming the alignment layer (S1120), performing the rubbing process for aligning the high molecule chain of the surface of the alignment layer material in the certain direction by rubbing the surface of the alignment layer material spread at step S1120 with the rubbing cloth and so on (S1130), combining the mother substrate for the TFT-array substrate and a mother substrate for a color filter substrate of which a color filter process is progressed (S1140), performing a scribe process with respect to the combined mother substrates to divide the combined mother substrates into a plurality of unit liquid crystal display panels 110 including the first substrate 210 corresponding to the TFT-array substrate and the second substrate 220 corresponding to the color filter substrate (S1150), attaching the data integrated circuit 212 and the gate integrated circuit 216 on the data pad portion 211 and the gate pad portion 215 in each of the unit liquid crystal display panels 110 (S1160), etc.

Meanwhile, at the above-mentioned step S1110, the configuration capable of dispersing the static electricity incurred during the rubbing process at step S130 may be further formed.

That is, in step S1110, the static electricity absorbing pattern 300 formed with the material identical to the material of the pixel electrode, e.g., ITO and so on, connected to the drain electrode (or the source electrode) of the TFT, a guide ring playing a role as a ground, and the connection line of which one terminal is connected to the static electricity absorbing pattern 300 and another terminal is connected to the guide ring may be further formed.

Meanwhile, at the above-mentioned step S1110, the configuration for dispersing the static electricity incurred when the integrated circuit is attached at step S1160 may be further formed.

That is, at step S1110, the connection pattern 800 electrically connecting each of the static electricity absorbing patterns 300 with a bumper metal of the data integrated circuit 212 adjacent to this may be further formed. This connection pattern 800 disperses the static electricity incurred from the data integrated circuit 212 to a large size of the static electricity absorbing pattern 300.

Hereinbelow, main steps among the steps of the method for manufacturing described with reference to FIG. 11 will be described in more detail with reference to FIGS. 12 to 17.

FIGS. 12 to 17 are views of respective main processes in the method for manufacturing the liquid crystal display device 100 according to an exemplary embodiment.

Figure 12:
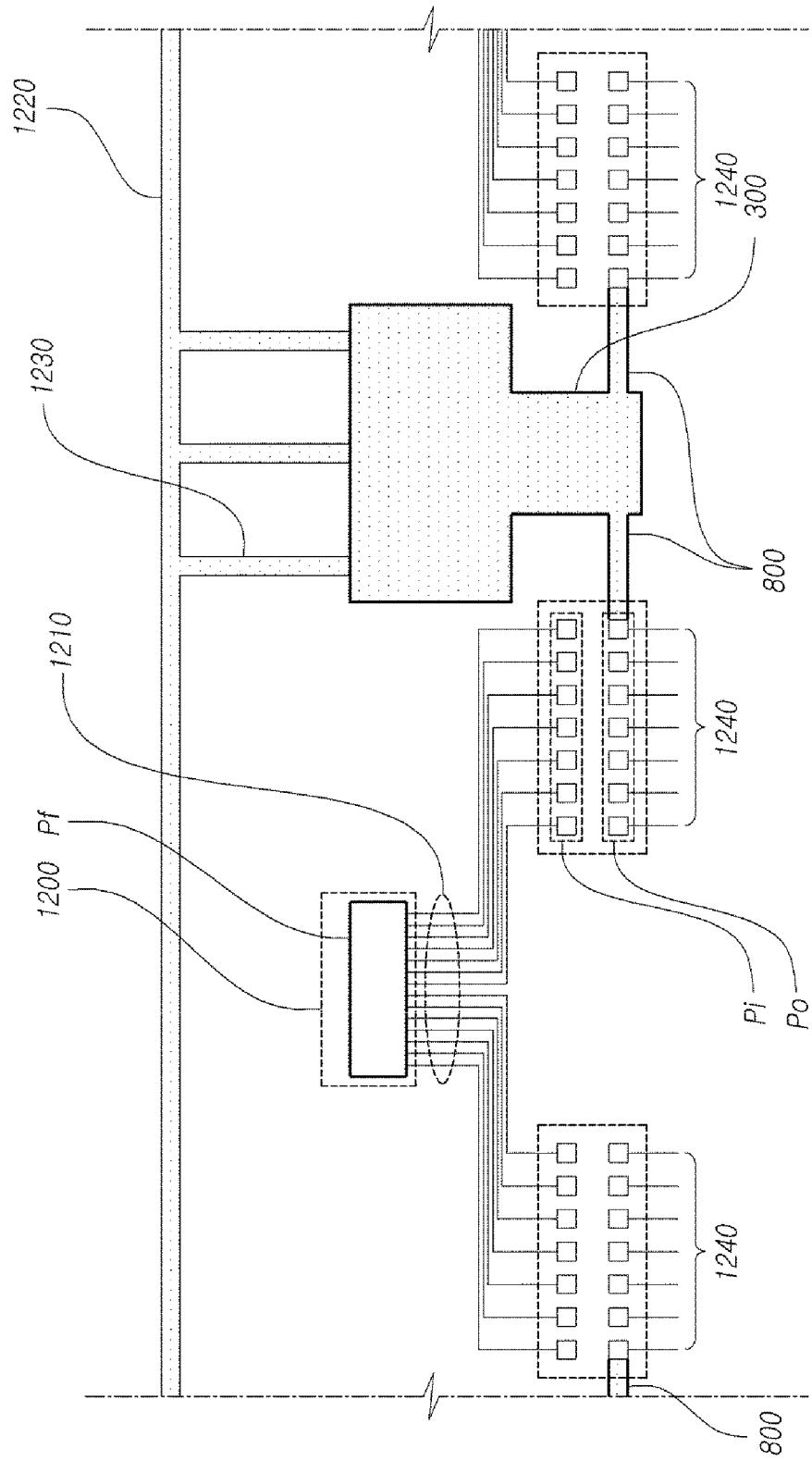

FIG. 12 is a view illustrating a data pad portion area in the mother substrate for the TFT-array substrate at step S1110 in FIG. 11.

Referring to FIG. 12, in each of the unit liquid crystal display panels of the mother substrate for the TFT-array substrate, a plurality of input pads Pi and a plurality of output pads Po are formed in the area 1000 where the data integrated circuit 212 is mounted, a flexible printed circuit pad Pf is formed at an area 1200 where the flexible printed circuit 213 is mounted, and a line 1210 connected to the flexible printed circuit pad Pf corresponding to the plurality of input pads Pi is formed. In addition, the plurality of output pads Po are connected with the data lines DL through a link line 1240.

Referring to FIG. 12, as the configuration capable of dispersing the static electricity generated when the rubbing is processed, the static electricity absorbing pattern 300 formed with the material, e.g., ITO and so on, identical to the material of the pixel electrode, a guide ring 1220 acting as a ground, and at least one connection line 1230 of which one terminal is connected to the static electricity absorbing pattern 300 and another terminal is connected to the guide ring may be further formed.

Referring to FIG. 12, as the configuration capable of dispersing the static electricity incurred when the integrated circuit is attached, the connection pattern 800 connecting the output pad Po to which the specific bumper, corresponding to the ground terminal of the data integrated circuit 212 among the plurality of output pads Po, is connected with the static electricity absorbing pattern 300 may be further formed.

Figure 13:
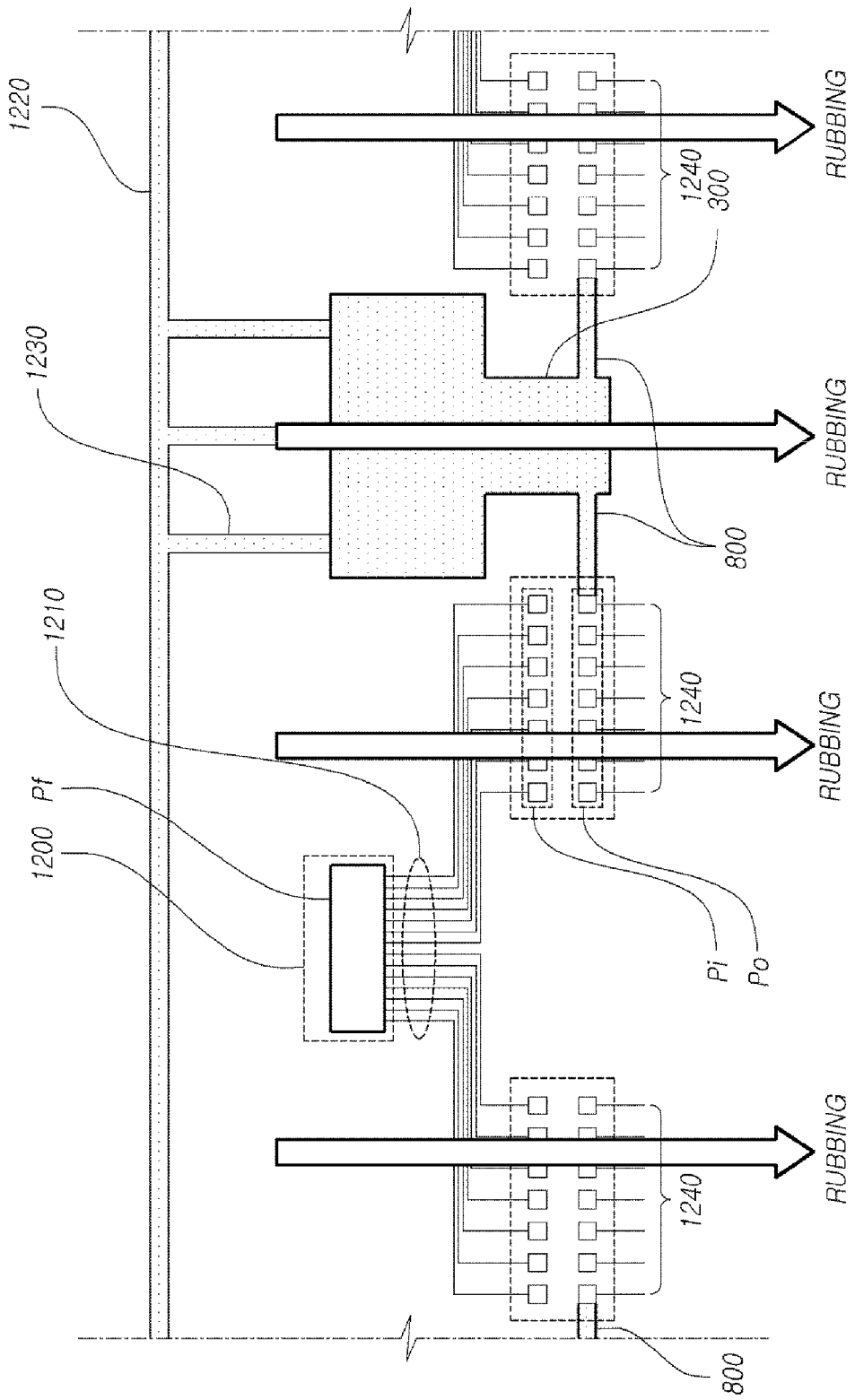

FIGS. 13 and 14 are views illustrating step S1130 of rubbing the surface of the alignment layer material 1430 spread on the pixel electrode 1420 at step S1120 in FIG. 11.

Referring to FIGS. 13, 14(A) and 14(B), for example, the mother substrate for the TFT-array substrate after step S1110 is moved, and a rubbing roller 1400 to which a cloth 1410 such as the rubbing cloth and so on is attached is rotated, simultaneously.

At this time, referring to FIG. 14(B), the cloth 1410 of the rubbing roller and so on rubs the second protrusion portions 520 of the second direction, crossing, e.g., intersecting, the rubbing direction, in the protrusion portion 400 of the static electricity absorbing pattern 300.

Meanwhile, the configurations (specially, the static electricity absorbing pattern 300) for dispersing the static electricity incurred when the rubbing is processed and the integrated circuit is attached in the mother substrate for the TFT-array substrate, when the rubbing with respect to the surface of the alignment layer material of the mother substrate for the TFT-array substrate is processed, may affect the rubbing process and the alignment of the liquid crystal.

Thus, in the present exemplary embodiment, the static electricity absorbing pattern 300 may be formed in the shape of which the whole surface is protruded, but the static electricity absorbing pattern 300 may be formed with the protrusion portion 400 of the lattice pattern by the plurality of grooves 410.

Differently from FIGS. 14(A) and 14(B), each of the distances D2 of the second protrusion portions 520 of the second direction crossing, e.g., intersecting, the rubbing direction, in the protrusion portion 400 of the static electricity absorbing pattern 300 may be very narrow, or the whole surface of the static electricity absorbing pattern 300 may be protruded.

In this case, the cloth 1410 such as the rubbing cloth and the like on the rubbing roller 1400 is bent by the protruded surface of the static electricity absorbing pattern 300 for a very long time. Thus, the force of restitution, i.e. the force of unfolding the cloth such as the rubbing cloth 1410 and the like of the rubbing roller 1400 after the cloth 1410 is bent, is decreased. This phenomenon is referred to as "memory phenomenon of the rubbing roller 1400".

Such a memory phenomenon of the rubbing roller 1400, when the static electricity absorbing pattern 300 is rubbed, and the surface of the alignment layer material 1430 is rubbed, in succession, may cause a problem of non-uniform rubbing on the surface of the alignment layer material 1430.

Due to such a non-uniform rubbing, the rubbing track of the first direction, e.g., the vertical direction, may not be uniform, the alignment of the liquid crystal may not be normal, and thus a defect of the liquid crystal display panel may arise.

Thus, in the present exemplary embodiment, as shown in FIGS. 4 to 7, the static electricity absorbing pattern 300 having the lattice pattern formed with the protrusion portion 400 including the first protrusion portions 510 of the first direction and the second protrusion portions 520 of the second direction by the plurality of grooves is formed.

Therefore, in the present exemplary embodiment, referring to FIGS. 14(A) and 14(B), when the rubbing is performed along the long first protrusion portions 510 of the first direction, e.g., the vertical direction, of the static electricity absorbing pattern 300, the memory phenomenon, identical to a case wherein the whole surface of the static electricity absorbing pattern 300 is protruded, may incur, but when the rubbing is performed along the long second protrusions 520 of the second direction, e.g., the horizontal direction, of the static electricity absorbing pattern 300, the memory phenomenon may be decreased or prevented.

Referring to FIG. 14(B), when the rubbing roller 1400 rubs the protruded surface of the second protrusion portions 520 through the second protrusion portions 520 of the second direction spaced apart from each other by the D2 distance due to the plurality of grooves 410, bending the cloth 1410 of the rubbing roller 1400 at the second protrusion portion 520 and unfolding the cloth 1410 of the rubbing roller 1400 at the groove 410 are repeated, and thus the force of restitution is not decreased.

Therefore, when the cloth 1410 of the rubbing roller 1400 rubs the surface of the alignment layer material 1430 following the static electricity absorbing pattern 300, the cloth 1410 of the rubbing roller 1400 may rub the surface of the alignment layer material 1430 in uniform intensity.

Thus, the uniform rubbing track of which a depth, a width and so on are uniform exists on the alignment layer material 1430, and resultantly, the normal alignment of the liquid crystal may be performed.

With relation to these points, each of widths W of the first protrusion portions 510 of the first direction of the static electricity absorbing pattern 300 may be equal to or narrower than the width Wp of the sub pixel, so that the static electricity absorbing pattern 300 discharges the static electricity to the outside and minimizes the memory phenomenon.

In addition, each of the distances D1 of the first protrusion portions 510 of the first direction of the static electricity absorbing pattern 300, in order to decrease the number of lines of the first direction incurring the memory phenomenon, may be as wide as possible, within a scope wherein the static electricity absorbing pattern 300 sufficiently discharges the static electricity to the outside. That is, the number of the first protrusion portions 510 of the first direction of the static electricity absorbing pattern 300 may be as small as possible within the scope wherein the static electricity absorbing pattern 300 sufficiently discharges the static electricity to the outside.

In addition, the distance D2 between the second protrusion portions 520 of the second direction of the static electricity absorbing pattern 300 may be the designed value for decreasing the memory effect of the rubbing roller 1400.

FIG. 15 is a view related to the scribe process for the unit liquid crystal display panel at step S1150 in FIG. 11, after combining the mother substrate for the TFT-array substrate with the mother substrate for the color filter substrate at step S1140 in FIG. 11.

Referring to FIG. 15, the area where the connection line 1230 and the guide ring 1220, formed as the configurations for dispersing the static electricity on the mother substrate for the TFT-array substrate, are formed is not included in the unit liquid crystal display panel area.

A cutting line 1500 for the scribe process is determined according to a size of the unit liquid crystal display panel, and should be located so as not to cut essential configurations (a pad, a wire and so on) related to a driving.

Thus, when the cutting line 1500 for the scribe process is located so as not to cut the essential configurations (the pad, the wire and so on) related to the driving, a portion of the static electricity absorbing pattern 300 may be cut. In addition, a portion of the connection line 1230 may remain.

After the scribe process for the unit liquid crystal display panel at step S1150 in FIG. 11, the manufacturing of the liquid crystal display panel 110 is finished.

Next, the data integrated circuit 212, the flexible printed circuit 213 and so on are attached on each of the liquid crystal display panels 110.

Next, a terminal of the flexible printed circuit 213 is connected to the printed circuit board 230, and other parts are assembled and packaged to finish the manufacturing the liquid crystal display device 100.

As described above, according to one or more embodiments of the present invention, there is the effect of providing the liquid crystal panel 110 and the liquid crystal display device 100 capable of decreasing the effect of the static electricity.

In addition, according to one or more embodiments, the present invention provides the method for manufacturing the liquid crystal display panel 110 and the liquid crystal display device 100 including the configurations (the static electricity absorbing pattern 300 and so on) for discharging the static electricity that is generated during the rubbing process to the outside of the liquid crystal display panel, and providing the liquid crystal display panel 110 and the liquid crystal display device 100 manufactured by the method.

In addition, according to one or more embodiments, the present invention provides the method for manufacturing the liquid crystal display panel 110 and the liquid crystal display device 100 including the configurations (the static electricity absorbing pattern 300, the connection pattern 800 and so on) capable of decreasing the effect of the static electricity that is generated when the integrated circuit is attached, and providing the liquid crystal display panel 110 and the liquid crystal display device 100 manufactured by the method.

In addition, according to one or more embodiments, the present invention provides the method for manufacturing the liquid crystal display panel and the liquid crystal display device including configurations for decreasing the effect of the static electricity and aligning the liquid crystal accurately by performing the rubbing process smoothly, and providing the liquid crystal display panel 110 and the liquid crystal display device 100 manufactured by the method.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the exemplary embodiments of the present invention disclosed herein are intended to illustrate the scope of the technical idea of the present invention, and the scope of the present invention is not limited by the exemplary embodiments. The scope of the present invention shall be construed on the basis of the accompanying claims in such a manner that all of the technical ideas included within the scope equivalent to the claims belong to the present invention.

What is claimed is:

1. A liquid crystal display device comprising:
a first substrate including an active area and a non-active area which corresponds to a peripheral area of the active area;
a static electricity absorbing pattern of a lattice pattern provided in the non-active area; and
a second substrate facing the first substrate,
wherein the static electricity absorbing pattern includes a protrusion portion having the lattice pattern configured with a plurality of grooves, and
wherein the protrusion portion includes:
first protrusion portions protruding in a first direction and provided spaced apart from each other, and
second protrusion portions crossing the first protrusion portions, protruding in a second direction, and provided spaced apart from each other.

2. The liquid crystal display device of claim 1, further comprising:
a plurality of data integrated circuits, and/or two or more flexible printed circuits,
wherein the two or more flexible printed circuits and/or the plurality of data integrated circuits are located in the non-active area, and
wherein the static electricity absorbing pattern is provided in an area where the two or more flexible printed circuits and/or the plurality of data integrated circuits are not located in the non-active area.

3. The liquid crystal display device of claim 2, wherein one flexible printed circuit to which N number of data integrated circuits belonging to each of data integrated circuit groups are connected is located adjacent to each of the data integrated circuit groups, in the first substrate, the each of the data integrated circuit groups including the N number of grouped data integrated circuits among the plurality of data integrated circuits, where N is a natural number equal to or greater than 2, and
wherein the static electricity absorbing pattern is formed in a peripheral area of an area where the one flexible printed circuit is located, in the first substrate.

4. The liquid crystal display device of claim 3, wherein the one flexible printed circuit and the static electricity absorbing pattern are alternately provided in an edge area of the first substrate.

5. The liquid crystal display device of claim 1, wherein a distance between the second protrusion portions is narrower than a distance between the first protrusion portions.

6. The liquid crystal display device of claim 1, wherein each of widths of the first protrusion portions is equal to or narrower than a width of a sub pixel.

7. The liquid crystal display device of claim 1, wherein the second direction crosses a rubbing direction of the first substrate.

8. The liquid crystal display device of claim 1, further comprising at least one pixel electrode, wherein the static electricity absorbing pattern comprises material identical to material of the pixel electrode.

9. The liquid crystal display device of claim 1, wherein the static electricity absorbing pattern is an electrically disconnected floating pattern.

10. The liquid crystal display device of claim 1, further comprising a connection pattern provided in the first substrate, the connection pattern electrically connecting a data integrated circuit adjacent to the static electricity absorbing pattern with the static electricity absorbing pattern.

11. The liquid crystal display device of claim 10, wherein the connection pattern connects a specific bumper of the data integrated circuit adjacent to the static electricity absorbing pattern with the static electricity absorbing pattern.

12. The liquid crystal display device of claim 11, wherein the specific bumper of the data integrated circuit to which the connection pattern is connected connects a ground terminal of the data integrated circuit with an output pad to which the connection pattern is connected.

13. The liquid crystal display device of claim 11, further comprising at least one pixel electrode, wherein the connection pattern comprises material identical to material of the pixel electrode.

* * * * *